United States Patent
Owens et al.

(12) 
(10) Patent No.: US 6,281,350 B1
(45) Date of Patent: Aug. 28, 2001

(54) METHODS FOR THE REDUCTION OF BLEEDING OF LIGNOSULFONATES FROM LIGNOSULFONATE-TREATED SUBSTRATES

(75) Inventors: Blair Alex Owens, Cincinnati; Dimitris Ioannis Collias, Mason; Andrew Julian Wnuk, Wyoming, all of OH (US)

(73) Assignee: Paper Technology Foundation Inc., Kalamazoo, MI (US)

( * ) Notice: Subject to any disclaimer, the term of this patent is extended or adjusted under 35 U.S.C. 154(b) by 0 days.

(21) Appl. No.: 09/466,164

(22) Filed: Dec. 17, 1999

(51) Int. Cl.$^7$ ........................................ C08B 1/00
(52) U.S. Cl. ................... 536/59; 536/123.1; 536/124
(58) Field of Search ................... 427/384; 536/59, 536/123.1, 124

(56) References Cited

U.S. PATENT DOCUMENTS

| | | | |
|---|---|---|---|
| 2,926,116 | 2/1960 | Keim | 162/164 |
| 3,332,901 | 7/1967 | Keim | 260/29.2 |
| 3,656,991 | 4/1972 | Blackwell et al. | 117/33.3 |
| 3,763,139 | * 10/1973 | Falkehag | 260/124 R |
| 3,849,184 | 11/1974 | Roberts | 117/155 |
| 3,865,803 | * 2/1975 | Falkehag | 260/124 A |
| 3,888,624 | 6/1975 | Blackwell et al. | 8/21 |
| 3,982,993 | 9/1976 | Fife | 162/158 |
| 4,040,899 | 8/1977 | Emerson | 162/13 |
| 4,191,610 | 3/1980 | Prior | 162/147 |
| 4,240,935 | 12/1980 | Dumas | 260/9 |
| 4,242,808 | 1/1981 | Luthi | 34/23 |
| 4,520,048 | 5/1985 | Ranger | 427/350 |
| 4,551,199 | 11/1985 | Weldon | 162/109 |
| 4,588,616 | 5/1986 | Menser | 427/430 |
| 4,702,943 | 10/1987 | Long | 427/282 |
| 4,718,931 | 1/1988 | Swenson et al. | 162/206 |
| 4,740,391 | 4/1988 | Long | 427/286 |
| 4,826,555 | 5/1989 | Long | 156/324 |
| 4,894,118 | 1/1990 | Edwards et al. | 162/112 |
| 4,915,989 | 4/1990 | Menser et al. | 427/434.2 |
| 4,919,758 | 4/1990 | Wagle et al. | 162/175 |
| 4,936,920 | 6/1990 | Keritsis et al. | 131/77 |
| 4,982,686 | 1/1991 | Long | 118/406 |
| 5,097,764 | 3/1992 | Waizmann | 101/425 |
| 5,120,773 | 6/1992 | Fischer et al. | 523/400 |
| 5,210,958 | 5/1993 | Bond et al. | 34/18 |
| 5,239,047 | 8/1993 | Devere et al. | 528/339.3 |
| 5,242,545 | 9/1993 | Bradway et al. | 162/135 |
| 5,338,404 | 8/1994 | Lucas et al. | 162/163 |
| 5,378,497 | 1/1995 | Johnson et al. | 427/211 |
| 5,456,800 | 10/1995 | Tansley et al. | 162/158 |
| 5,510,004 | 4/1996 | Allen | 162/168.2 |
| 5,585,456 | 12/1996 | Dulaney et al. | 528/332 |
| 5,630,285 | 5/1997 | Kerttula | 34/446 |
| 5,698,295 | 12/1997 | Benner et al. | 428/182 |
| 5,776,546 | 7/1998 | Long | 427/402 |
| 5,935,383 | 8/1999 | Sun et al. | 162/158 |
| 6,194,057 | * 2/2001 | Schennum et al. | 428/211 |
| 6,211,357 | * 3/2001 | Owens et al. | 536/59 |

FOREIGN PATENT DOCUMENTS

| | | |
|---|---|---|
| EP 0 418 015 A1 | 3/1991 | (EP) . |
| EP 0 816 562 A2 | 6/1998 | (WO) . |
| WO 98/24974 | 6/1998 | (WO) . |

OTHER PUBLICATIONS

Siegfried Fischer: "Pressure Impregnating of Decorative and Kraft Papers"; 1994; Plastic Laminates Symposium, p. 133–137.

William O. Kroeschell: "Bonding on the corrugator"; 1989; TAPPI, p. 67–72.

R. Nigel Jopson: "Saturation technology for corrugated containers"; Apr. 1993; Tappi Journal vol. 76, No. 4, p. 207–214.

Robert W. Hagemeyer et al.: "Pulp and Paper Manufacture, 3rd edition, vol. 6"; 1992; The Joint Textbook Committee of the Paper Industry, Tappi, CPPA, Montreal, Canada, p. 65–85 (H.H. Espy: "Wet–strength resins").

Database WPI–Section Ch, Week 199347: Derwent Publications Ltd., London, GB; Class A23, AN 1993–375856 XP 002128022 & SU 1 773 925A (Below Chem Articles Prodn Assoc), Nov. 7, 1992, abstract.

Database WPI–Section Ch, Week 197548: Derwent Publications Ltd., London, GB; Class A28, AN 1975–79396W XP 002128024 & JP 50 076308A (Sumitomo Chem Co Ltd), Jun. 23, 1975, abstract.

Database WPI–Section Ch, Week 199124: Derwent Publications Ltd., London, GB; Class A82, AN 1991–176285 XP 002128023 & SU 1 581 465A (Mariupol Metallurgy), Jul. 30, 1990, abstract.

Application No. 09/190,903, P&G Case No. 7307, Inventors Owens et al., Filing Date Nov. 12, 1998, Allowed Jan. 10, 2000, U.S. Ser. No. 6114471.

* cited by examiner

Primary Examiner—Erma Cameron

(57) ABSTRACT

The bleeding of lignosulfonates from lignosulfonate-treated substrates when contacted under humid conditions is reduced by rendering the lignosulfonates water-insoluble via reacting them with an amine polymer-epichlorohydrin adduct containing at least one quaternary ammonium group under acidic conditions.

2 Claims, No Drawings

METHODS FOR THE REDUCTION OF BLEEDING OF LIGNOSULFONATES FROM LIGNOSULFONATE-TREATED SUBSTRATES

FIELD OF THE INVENTION

The present invention relates to methods of reducing the bleeding of lignosulfonates from lignosulfonate-treated substrates when contacted under humid conditions by rendering the lignosulfonates water insoluble.

BACKGROUND OF THE INVENTION

Lignosulfonates are water-soluble materials. They are used in various applications and products, such as preparation of concrete admixtures, feed pellets, oil drilling muds, road stabilization, emulsion and dispersion stabilization, plant nutrition, leather tanning, dust collection, road de-icing and other applications. Lignosulfonates are metal or ammonium salts of lignosulfonic acids, and are either by-products of the sulfite pulping process, or products of sulfonation of other lignin derivatives. Lignin derivatives include, but are not limited to, kraft lignin, organosolv lignin, chemically modified lignin derivatives, and mixtures thereof.

Lignosulfonates can also be used to strengthen various substrates by treating them (e.g. coating, impregnating, etc.) with lignosulfonate solutions. Examples of these substrates are lignocellulosic-based substrates (such as paper, cardboard, and webs containing mixtures of lignocellulosic and polymer fibers). Note that for the purposes of this disclosure the terms "lignocellulosic-based substrates" and "substrates" will be used interchangeably. However, one major problem with using the lignosulfonates in the strengthening applications above is that they bleed off the substrates when contacted under humid conditions (e.g. touched with wet hands). This results in poor aesthetics, increased messiness, and poor strength retention. One method to reduce or eliminate this bleeding is to coat the treated substrates with wax or polymer films. However, this coating method is not an effective solution because the secondary coating materials are expensive to purchase, process and apply. Yet another method to reduce or eliminate the bleeding of the water-soluble lignosulfonates is to insolubilize them by crosslinking.

The crosslinking reactions for lignosulfonates that have been reported in the literature include the following: 1) condensation reaction with strong mineral acids at elevated temperatures (via the $SO_3^{2-}$ units); 2) oxidative coupling reaction with hydrogen peroxide and catalysts (via the $OH^-$ groups); 3) reaction with bis-diazonium salts (via the α-position to the $OH^-$ groups); 4) reaction with bifunctional acid chlorides (via the $OH^-$ groups); 5) reaction with cyanuric chloride (via the $OH^-$ groups); 6) reaction with formaldehyde (via the $CH_2$ groups); 7) reaction with furfural (via the α-position to the $OH^-$ groups); and 8) reaction with epichlorohydrin (via the $OH^-$ groups). However, the above reactions/processes include various processing problems, such as cost, low pH, long reaction times, harsh conditions (e.g. temperature), health hazards, etc.

What have been missing are simple and inexpensive methods to render lignosulfonates water insoluble, thus reducing or eliminating their bleeding from the lignosulfonate-treated substrates when contacted under humid conditions.

SUMMARY OF THE INVENTION

The present invention relates to methods of rendering lignosulfonates water insoluble by reacting them with an amine polymer-epichlorohydrin adduct containing at least one quaternary ammonium group under acidic conditions. This results in reduction of the bleeding problem of the originally water-soluble lignosulfonates from the substrates when contacted under humid conditions.

DETAILED DESCRIPTION OF THE INVENTION

It is known that the strength of lignocellulosic-based substrates (e.g. paper, linerboard, corrugated, cartonboard, etc.) can be improved by treating them with various aqueous solutions of strengthening agents (e.g. sodium silicate, starch, carboxy methyl cellulose—CMC, xylan, etc.). Unfortunately, these water-soluble strengthening agents bleed off the substrates when contacted under humid conditions.

Lignosulfonates are water-soluble strengthening agents that can also be used to strengthen lignocellulosic-based substrates. The lignosulfonates contain sulfonic units ($HSO_3^-$; also called hydrogen sulfite units) and sulfonate units ($SO_3^{2-}$; also called sulfite units), and for the purposes of this disclosure the term "sulfonic" will be used to encompass both "sulfonic" and "sulfonate" units. It is expected that the lignosulfonates strengthen the lignocellulosic-based substrates by reinforcing their fibers and/or fiber bonds, via encapsulation and/or penetration. Lignosulfonates are examples of a variety of possible lignin derivatives that may be used. Lignin derivatives include, but are not limited to, kraft lignin, organosolv lignin, chemically modified lignin derivatives wherein the nucleophilic sulfonic unit is preserved, and mixtures thereof.

Unexpectedly it was found that an aqueous calcium lignosulfonate solution (LIGNOSITE 50; Georgia-Pacific Inc.; Atlanta, Ga.), containing 40% calcium lignosulfonate and 10% inert solids, when mixed together with aqueous amine polymer-epichlorohydrin adducts containing quaternary ammonium groups under acidic conditions exhibits a virtually instantaneous reaction that results in a precipitate. This precipitate exhibits water-insoluble properties. This mixing is a simple, inexpensive, and fast process that is carried out under ambient conditions and without the need for complex pieces of equipment. At acidic pH levels, such as pH=3, amine polymer-epichlorohydrin adducts contain quaternary ammonium groups and have a charge density of about 3.2 meq/g. It was also unexpectedly found that aqueous sodium lignosulfonate (LIGNOSITE 458; Georgia-Pacific Inc.) and ammonium lignosulfonate (LIGNOSITE 1740; Georgia-Pacific Inc.) when independently mixed together with an aqueous amine polymer-epichlorohydrin adduct containing quaternary ammonium groups under acidic conditions exhibit a virtually instantaneous reaction that results in a precipitate.

For the purpose of this disclosure, the term "amine polymer-epichlorohydrin adduct(s)" refers to any resins made by the reaction of a polyamine or an amine-containing polymer with an epoxide possessing an epichlorohydrin second functional group. Two commercially available amine polymer-epichlorohydrin adducts containing quaternary ammonium groups at pH=3 are KYMENE® 450 and KYMENE® 557H from Hercules Inc. (Wilmington, Del.). These KYMENE® products contain 20% and 12.5% solids, respectively. The amine polymer-epichlohydrin is also referred to as either: a) polyamide polyamine epichlorohydrin (PAE), or b) poly(aminoamide) epichlorohydrin, or c) amino polyamide epichlorohydrin, or d) polyamide epichlorohydrin, or e) amine polymer-epichlorohydrin (APE), or f) polyalkylenepolyamine-epichlorohydrin (PAPAE). For the purposes of this disclosure the term "KYMENE®" shall refer to the class of amine polymer-epichlorohydrin adducts, more commonly known as polyamide polyamine epichlorohydrin resins, containing quaternary ammonium groups at pH=3. KYMENE® is a compound that is used as a wet-strength agent in paper applications. Preparation of KYMENE® is described in great details in Keim, U.S. Pat. No. 2,926,116, issued Feb. 23, 1960; Keim, U.S. Pat. No. 3,332,901, issued Jul. 25, 1967; Keim, U.S. Pat. No. 3,700,623, issued Oct. 24, 1972; and Keim, U.S. Pat. No. 4,537,657, issued Aug. 27, 1985. Although it is known that KYMENE® has a strong affinity for itself (as it crosslinks primarily with itself) and a slight affinity for cellulose or CMC (via the cellulose's carboxyl), it has never been disclosed or found that KYMENE® has a strong affinity for lignosulfonates.

As referenced in U.S. Pat. No. 4,537,657, KYMENE® 450 amine polymer-epichlorohydrin adduct at pH=3 has the general formula

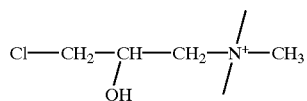

Another commercial source of a useful polyamide polyamine epichlorohydrin compound containing quaternary ammonium groups at pH=3 is Henkel Inc. (Düsseldorf, Germany), which markets such compound under the trademark Fibrabond™, as referenced in U.S. Pat. No. 5,239,047.

Without wishing to be bound by theory, we believe that the crosslinking takes place between the highly nucleophilic sulfonic or sulfonate units of the lignosulfonate and the quaternary ammonium groups of the amine polymer-epichlorohydrin adduct. Furthermore, we believe that 3-D molecular conformations, active unit spacings and charge density, and steric effects play important roles in determining the strength of the crosslinking association. The above hypotheses were tested in various series of experiments.

In the first series of experiments, various lignosulfonate solutions were tested with KYMENE® 450 at pH=3, to determine which ones react similarly to LIGNOSITE 50. Out of the 20 lignosulfonate solutions supplied by Westvaco (Westvaco Inc., New York, N.Y.), Lignotech (Borregaard Lignotech Inc., Sarpsborg, Norway), and Georgia-Pacific only 16 (Westvaco's REAX 83A, Westvaco's REAX 85A, Westvaco's KRAFTSPERSE EDF450, Lignotech's WANIN S, Lignotech's UFOXANE 3A, Lignotech's NORLIG G, Lignotech's NORLIG A, Lignotech's MARASPERSE N-22, Lignotech's MARASPERSE N-3, Lignotech's MARASPERSE AG, Lignotech's MARASPERSE CBA-1, Lignotech's WELLTEX 200, Lignotech's WELLTEX 300, Lignotech's WELLTEX 300F, Georgia-Pacific's LIGNOSITE 1740, and Georgia-Pacific's LIGNOSITE 458) formed a precipitate similar to that of LIGNOSITE 50. Finally, kraft lignin (INDULIN AT from Westvaco Inc.), which has hydroxyl but not sulfonic/sulfonate units, could not form a precipitate with KYMENE® 450. Polystyrene sulfonate (from Aldrich Inc., Milwaukee, Wis.), which has sulfonic but not hydroxyl units, was combined with KYMENE® 450 and resulted in a precipitate. However, polyvinyl sulfonate (from Aldrich Inc.) did not form a precipitate when combined with KYMENE® 450. All the above experiments point to the fact that the existence of the sulfonic/sulfonate units in a compound is a necessary but not a sufficient condition for a reaction between this compound and KYMENE® 450 to form a precipitate.

On the other hand, the importance of the 3-D molecular conformation, active unit spacing, and steric effects of amine polymer-epichlorohydrin adducts containing quaternary ammonium groups under acidic conditions was tested by reacting poly(3-chloro-2-hydroxypropyl-2-methacroxyethyl-dimethylammonium chloride) [CAS #76123-64-3; Polysciences Inc.; Warrington, Pa.], which is not an amine polymer-epichlorohydrin adduct but has quaternary ammonium groups and a charge density of 3.5 meq/g at pH=3, with lignosulfonate. The resulting product was a thickened slurry of the two polymeric compounds, unlike the precipitate between lignosulfonate and KYMENE®.

In another series of experiments designed to emphasize the importance of the quaternary amine group of amine polymer-epichlorohydrin adducts, polyethylenimine (PEI; Aldrich Inc.) which contains tertiary amines was mixed with lignosulfonate and produced a water-soluble thickened slurry, unlike the precipitate between lignosulfonate and KYMENE®.

It was also discovered that the precipitate between lignosulfonate and KYMENE® will only stay water-insoluble within a certain pH range. More specifically, it was discovered that certain alkaline conditions, which may be dependent upon the compounds reacted, will solubilize the precipitate. For example, the precipitate from the reaction of calcium lignosulfonate LIGNOSITE 50 and KYMENE® 450 will solubilize in water if the pH is about 11 or higher.

This crosslinking reaction and treatment can be applied to the substrate at any stage of the substrate manufacturing process. If the substrate in lignocellulosic material, the stages of the manufacturing process include the pulp stage, wet end of the paper making process (e.g. in the headbox, or formation section, or press section), and dry end (e.g. in the drying section or size press), or even to dry material already processed (e.g. linerboard, and medium) and formed into final products (e.g. corrugated board). In general, there are two methods to form the precipitate and apply it to the substrates.

In the first method, the precipitate is formed in the substrate (also called in-situ method) and in the second method the precipitate is pre-formed and then applied to the substrate. In one variation of the in-situ method, the water-soluble strengthening agent containing at least one nucleophilic sulfonic unit is applied to the substrate first and the amine polymer-epichlorohydrin adduct containing at least one quaternary ammonium group is applied second. In another variation of the in-situ method, the amine polymer-epichlorohydrin adduct containing at least one quaternary ammonium group is applied to the substrate first, and the water-soluble strengthening agent containing at least one nucleophilic sulfonic unit is applied second. Various methods may be used to apply both the amine polymer-epichlorohydrin adduct containing at least one quaternary ammonium group and the water-soluble strengthening agent containing at least one nucleophilic sulfonic unit. Such methods of application include, but are not limited to, immersion, coating, and incorporation by pressure (e.g. MIPLY pressure saturation method; U.S. Pat. No. 4,588,616 herein incorporated by reference). The chosen method to apply the amine polymer-epichlorohydrin adduct containing at least one quaternary ammonium group need not be the same as the chosen method to apply the water-soluble strengthening agent containing at least one nucleophilic sulfonic unit.

The in-situ method can be used for a single substrate as well as for a laminate structure of plies of substrates. In the latter case, the compound containing the sulfonic units and the amine polymer-epichlorohydrin adduct containing quaternary ammonium groups can be applied on the same ply or on two subsequent plies or between two plies. Note that when the compound containing the sulfonic units is applied to one ply and the amine polymer-epichlorohydrin adduct containing quaternary ammonium groups applied to the subsequent ply, the precipitate that is formed between the plies performs well as a water-resistant adhesive.

In the second method, the precipitate is formed first by mixing an amine polymer-epichlorohydrin adduct containing at least one quaternary ammonium group and a water-soluble strengthening agent containing at least one nucleophilic sulfonic unit and then it is applied to a substrate. Similarly to the in-situ method, this method can be used for a single substrate as well as for a laminate structure of plies of substrates. In the latter case, the precipitate can be applied to a single ply or between two plies. Note that when the precipitate is applied between two plies, it also performs well as a water-resistant adhesive.

Lignosulfonate may be used in either solid form (e.g. powder) or liquid form (e.g. solution or dispersion in water, or mixtures of water and organic solvents). For example, lignosulfonate powder (e.g. LIGNOSITE 100 from Georgia-Pacific Inc.) can be mixed with an aqueous KYMENE® solution and result in a precipitate, similar to the precipitate resulting from the mixture of lignosulfonate and KYMENE® solutions. Similarly, the KYMENE® can be used either in the solid form (e.g. powder) or liquid form (e.g. solution or dispersion in water, or mixtures of water and organic solvents).

In general, the solvent or dispersant of the solution or dispersion of the strengthening agents may or may not contain water, i.e., it can be totally aqueous, or totally organic, or it can contain mixtures of water and organic solvents. Furthermore, the strengthening agents can be in pure form or in mixtures with other inert or active agents.

The reduction of bleeding of lignosulfonate from lignosulfonate-KYMENE® treated paper is shown in the following example.

EXAMPLE

The reduction of bleeding is checked by submerging paper samples in water for a period of several days. Two sets of samples are prepared. The first set of samples is made using 35# linerboard (i.e., 35 pounds per thousand square feet; 35 lb/msf; 170 $g/m^2$ or 170 grams per square meter; product USP70 from Georgia-Pacific Inc.) dipped into an aqueous solution of calcium lignosulfonate LIGNOSITE 50 for 1 minute. The second set of samples is made using 35# linerboard dipped first into an aqueous solution of calcium lignosulfonate for 1 minute, then wiped free of excess aqueous solution, and then dipped into an aqueous solution of 5.0% KYMENE® 450 at pH=3 for 10 seconds. Both sets of samples are dried between two heated platens at 177° C. for 10 seconds. Both sets of samples are then submerged in water at room temperature for a period of at least three days. The water around the lignosulfonate-treated samples turns dark brown indicating that amounts of lignosulfonate bleed from the samples. However, the water around the lignosulfonate-KYMENE® treated samples remains clear indicating that no lignosulfonate bleeds from the samples.

We claim:

1. A method of rendering lignosulfonate water insoluble, said method comprising the step of mixing said lignosulfonate with an amine polymer-epichlorohydrin adduct containing at least one quaternary ammonium group under acidic conditions.

2. A method according to claim 1, wherein said lignosulfonate is selected from the group consisting of metal salts of lignosulfonic acid, ammonium salts of lignosulfonic acid, and any further chemically modified lignin derivatives wherein the nucleophilic sulfonic unit is preserved, and mixtures thereof.

* * * * *